US011702871B2

(12) United States Patent
Law Hing Ping et al.

(10) Patent No.: US 11,702,871 B2
(45) Date of Patent: Jul. 18, 2023

(54) METHOD FOR UNLOCKING A HOOD OF A VEHICLE

(71) Applicant: Ningbo Geely Automobile Research & Development Co., Ltd., Ningbo (CN)

(72) Inventors: Siet-Ming Law Hing Ping, Gothenburg (SE); David Gallegos, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 314 days.

(21) Appl. No.: 17/125,782

(22) Filed: Dec. 17, 2020

(65) Prior Publication Data

US 2021/0108452 A1 Apr. 15, 2021

Related U.S. Application Data

(63) Continuation of application No. PCT/CN2019/091356, filed on Jun. 14, 2019.

(30) Foreign Application Priority Data

Jun. 26, 2018 (EP) ..................................... 18179893

(51) Int. Cl.
*E05B 83/24* (2014.01)
*E05B 81/08* (2014.01)
(Continued)

(52) U.S. Cl.
CPC ............ *E05B 83/243* (2013.01); *B62D 25/12* (2013.01); *E05B 77/54* (2013.01); *E05B 81/08* (2013.01);
(Continued)

(58) Field of Classification Search
CPC ...... E05B 83/24; E05B 83/243; E05B 83/247; E05B 83/26
See application file for complete search history.

(56) References Cited

U.S. PATENT DOCUMENTS

| 5,853,060 A | 12/1998 | Chao et al. | |
| 8,798,858 B2 * | 8/2014 | Zysk | E05B 83/26 307/326 |

(Continued)

FOREIGN PATENT DOCUMENTS

| CN | 104033048 A | 9/2014 |
| CN | 104563679 A | 4/2015 |

(Continued)

OTHER PUBLICATIONS

International Search Report from corresponding International Application No. PCT/CN2019/091356, dated Sep. 19, 2019, 2 pages.

*Primary Examiner* — Alyson M Merlino
(74) *Attorney, Agent, or Firm* — Tucker Ellis LLP

(57) ABSTRACT

A method for unlocking a hood of a vehicle in which a latch and a safety catch are arranged for engaging a striker and a locking member is arranged for engaging the safety catch. The method includes displacing the safety catch if a predetermined vehicle condition is fulfilled from a closed state wherein the safety catch is in locking engagement with the striker to an open state where the safety catch is disengaged from the striker for moving the hood locking mechanism from the intermediate locked mode to an open mode.

17 Claims, 7 Drawing Sheets

(51) Int. Cl.
*E05B 81/68* (2014.01)
*E05B 77/54* (2014.01)
*B62D 25/12* (2006.01)
*E05B 79/20* (2014.01)
*E05B 85/26* (2014.01)

(52) U.S. Cl.
CPC .............. *E05B 81/68* (2013.01); *E05B 79/20* (2013.01); *E05B 85/26* (2013.01)

(56) References Cited

U.S. PATENT DOCUMENTS

| | | | | |
|---|---|---|---|---|
| 9,174,597 | B2 * | 11/2015 | Ghannam | B60R 21/0134 |
| 9,284,757 | B2 * | 3/2016 | Kempel | E05B 83/26 |
| 9,777,516 | B2 * | 10/2017 | Farooq | E05B 83/24 |
| 10,060,164 | B2 * | 8/2018 | Rao | E05B 83/243 |
| 10,808,436 | B2 * | 10/2020 | Cuddihy | E05B 83/24 |
| 11,414,900 | B2 * | 8/2022 | Sturm | E05B 83/24 |
| 2015/0191943 | A1 * | 7/2015 | Tieman | E05B 85/26 292/195 |
| 2017/0138098 | A1 * | 5/2017 | Covarrubias Pazaran | E05B 83/24 |
| 2019/0128028 | A1 * | 5/2019 | Herline | E05B 83/24 |
| 2020/0071971 | A1 * | 3/2020 | Cho | E05B 83/24 |

FOREIGN PATENT DOCUMENTS

| | | | | |
|---|---|---|---|---|
| CN | 106246015 | A | | 12/2016 |
| KR | 2010025114 | A * | 3/2010 | ............. E05B 83/24 |
| KR | 100984959 | B1 * | 10/2010 | |
| KR | 20130019686 | A | | 2/2013 |
| WO | 9845559 | A1 | | 10/1998 |
| WO | 2013087454 | A1 | | 6/2013 |
| WO | 2017174980 | A2 | | 10/2017 |
| WO | 2017174980 | A3 | | 10/2017 |
| WO | 2018050149 | A1 | | 3/2018 |

* cited by examiner

METHOD FOR UNLOCKING A HOOD OF A VEHICLE

RELATED APPLICATION DATA

This application is a continuation of International Patent Application No. PCT/CN2019/091356, filed Jun. 14, 2019, which claims the benefit of European Patent Application No. 18179893.5, filed Jun. 26, 2018, the disclosures of which are incorporated herein by reference in their entireties.

TECHNICAL FIELD

The present disclosure relates to a method for unlocking a hood of a vehicle, wherein a hood locking mechanism comprises a latch, a safety catch, a locking member, and a striker; wherein the latch and the safety catch are arranged for engaging the striker and the locking member is arranged for engaging the safety catch. The disclosure further relates to a system for unlocking a hood, and a vehicle having a system for unlocking a hood.

BACKGROUND

There are mainly two different systems and methods for unlocking vehicle hoods, such as car hoods, that are used on today's vehicles on the market. Due to safety regulations, the systems use a two-step opening process, where the hood is opened through a double action from a user of the vehicle. There are mainly two different systems on the market, the single-pull hood latch system and the double-pull latch system.

Single-pull hood latch systems are opening a hood locking mechanism from a fully locked mode to an intermediate locked mode through a single-pull action from the user. When the user is pulling an opening handle arranged in the interior structure of the car, the hood locking mechanism is opened to the intermediate locked mode. To further move the hood locking mechanism into an open mode, a manual action from the user is required, and often a safety catch arranged in connection to the hood locking mechanism at the front section of the car must be released to open the hood. Since with the single-pull system the user is required to release the safety catch manually, the opening operation is many times inconvenient and complicated, and there is also a risk that the user's hands or clothes are getting soiled.

Double-pull hood latch systems are opening the hood locking mechanism from the fully locked mode to the open mode through a double-pull action from the user. When the user is pulling the opening handle in a first sequence, the hood locking mechanism is opened from the fully locked mode to the intermediate locked mode. Thereafter, the opening handle needs to be released and then pulled again in a second sequence to move the hood locking mechanism from the intermediate locked mode to the open mode. With the double-pull system the user is not required to release a safety catch arranged at the front section of the car, which simplifies the opening of the hood, and further eliminates the need for manually opening the hood in front of the car, which many times are complicated and risking that the user's hands or clothes are getting soiled. The double-pull systems are considered to provide a more simplified opening of the hood with a premium feeling compared to the single-pull systems. However, since double-pull systems are not constructed with a safety catch, they are considered to be less safe in accidents or crash situations. The dual-pull action is also considered to be an inconvenient way of opening the hood.

There is thus a need for an improved hood opening system and method where the opening system fulfils the safety regulations, has the same safety level as the single-pull systems with the premium feeling of the double-pull systems, but with a more convenient opening procedure as with the two systems used today.

SUMMARY

An object of the present disclosure is to provide a method for unlocking a hood of the vehicle, a system for unlocking a hood, and a vehicle having a system for unlocking a hood, where the previously mentioned problems are avoided. This object is at least partly achieved by the features of the independent claims. The dependent claims contain further developments of the method for unlocking the hood of a vehicle.

The disclosure concerns a method for unlocking a hood of a vehicle, wherein a hood locking mechanism comprises a latch, a safety catch, a locking member, and a striker. The latch and the safety catch are arranged for engaging the striker and the locking member is arranged for engaging the safety catch. The method comprises the steps; manually displacing a door of the vehicle, wherein the door in a closed position is blocking an inner hood handle, from the closed position to an open position in a fully locked mode of the hood locking mechanism for giving access to the inner hood handle; manually activating the inner hood handle for moving the hood locking mechanism from the fully locked mode to an intermediate locked mode, wherein the activation of the inner hood handle mechanically is displacing the latch from a closed position where the latch is in locking engagement with the striker to an open position where the latch is disengaged from the striker; triggering a sensor by the latch, when the latch is displaced to the open position, wherein an electrical signal from the sensor is activating the locking member after a predetermined time interval if at least one predetermined vehicle condition is fulfilled, where upon activation, the locking member is displaced from a first position where the locking member is in locking engagement with the safety catch to a second position where the locking member is disengaged from the safety catch; displacing the safety catch if the at least one predetermined vehicle condition is fulfilled from a closed state wherein the safety catch is in locking engagement with the striker to an open state where the safety catch is disengaged from the striker for moving the hood locking mechanism from the intermediate locked mode to an open mode.

The method is providing a simple way for unlocking the hood of the vehicle with only a single-pull action, where the method is convenient to the user of the vehicle and fulfils the safety regulations. With the method, a solution that is not requiring double manual operation from the user is achieved with the same safety level as with traditional single-pull systems, since the system is equipped with a safety catch. The user is with the method not required to open the hood at the front section of the car and with only a single-pull action at least the same premium feeling as with a double-pull system is achieved. Further, the method is providing a more convenient opening of the hood compared to both the single-pull systems and the double-pull systems used today.

According to an aspect of the disclosure, in the fully locked mode, the latch and the safety catch are in locking engagement with the striker, and the locking member is in locking engagement with the safety catch. In the intermediate locked mode, the latch is disengaged from the striker, the safety catch is in locking engagement with the striker, and the locking member is in locking engagement with the safety catch. In the open mode, the latch and the safety catch are disengaged from the striker, and the locking member is disengaged from the safety catch. The three different modes are providing a safe system, where the hood is opened in two different steps. The intermediate locked mode is securing that the hood is not directly fully opened which could cause accidents if opened unintentionally, for example during driving. The intermediate locking mode is configured so that the system cannot move the hood locking mechanism to the open mode unless the predetermined vehicle conditions are fulfilled, as described above. In the fully locked mode both the latch and the safety catch are securing that the striker is engaged and that the hood is not opened, which for example could happen in a crash situation or accident. In the intermediate locked mode, the safety catch is engaging the striker preventing that the hood is further opened, for example if an accident occurs.

According to another aspect of the disclosure, the at least one predetermined vehicle condition is a standstill position of the vehicle, an open position of a vehicle driver door, an activated position of a parking brake, and/or a parking position of a transmission of the vehicle. The predetermined vehicle conditions are used to secure that the hood is opened only in safe vehicle situations. The predetermined vehicle conditions are one or more prerequisites that needs to be fulfilled before it is possible to open the hood. The prerequisites a standstill position of the vehicle, an activated position of a parking brake, and/or a parking position of a transmission of the vehicle are securing that the vehicle is not moving when opening the hood. The prerequisite open position of a vehicle driver door can be used to secure that the user of the vehicle actively is performing a conscious action, and could especially be used in combination with the one or more other conditions where the vehicle is in a standstill position.

According to other aspects of the disclosure, the at least one predetermined vehicle condition is a determination if a user is standing in front of the vehicle, and the determination if the user is standing in front of the vehicle is established through key position recognition and/or biometric recognition. This condition could be used to secure that the user of the vehicle is actively taking action and is standing in front of the vehicle before the hood is opened, and could especially be used in combination with the one or more other conditions where the vehicle is in a standstill position. Also with this prerequisite, the user of the vehicle is actively performing a conscious action.

According to an aspect of the disclosure, the locking member is electrically displaced from the first position to the second position. Through electrical displacement, the system can be designed to automatically unlock the hood without any interaction from the user of the vehicle, which is providing a simple and efficient opening of the hood. However, the system may be designed so that the locking member is mechanically displaced from the second position to the first position during a closing operation of the hood.

According to a further aspect of the disclosure, the safety catch in the open state is blocking the locking member, preventing the locking member from being displaced from the second position to the first position. This feature is preventing that the locking member is repositioned to the first position when the safety catch is in the open state. The blocking function is used to secure that the locking member can be repositioned only when the safety catch is in the closed state and when returning to the first position, the locking member is engaging the safety catch preventing the safety catch to move to the open state.

According to an aspect of the disclosure, the predetermined time interval is in the range 1-30 seconds. The time interval is chosen so that a relevant level of safety is met with the method, and any time interval between 1-30 second is possible to use. A suitable time interval could for example be dependent on safety regulations or legislations.

According to another aspect of the disclosure, the hood locking mechanism is a single-pull action hood unlocking mechanism, wherein the manual activation of the inner hood handle is a single-pull action, releasing the hood of the vehicle from the from the fully locked mode to the intermediate locked mode. The single-pull action mechanism is a simple and easy-to-use method for the user of the vehicle. The single-pull activation of the hood locking mechanism according to the disclosure is providing a method where only one opening action is required by the user if the at least one predetermined vehicle condition is fulfilled, since the system automatically will unlock the hood locking mechanism once the single pull action is completed.

According to a further aspect of the disclosure, the locking member is a solenoid comprising a plunger, which plunger when activated is electrically displaced from the first position to the second position, and when not activated through spring action is held in the first position. Solenoids are simple in construction and also reliable. The spring action is used for repositioning the locking member from the second position to the first position and also to hold the locking mechanism in the first position.

According to an aspect of the disclosure, the safety catch, when the locking member is disengaged from the safety catch, is displaced from the closed state to the open state through spring action. The spring activation of the safety catch is a simple and reliable constructional design that is moving or repositioning the safety catch from the closed state to the open state. When the locking member is disengaged from the safety catch the safety catch is free to move to the open state.

According to another aspect of the disclosure, the method further comprises the steps; activating a notification signal when the latch is displaced to the open position; and/or when the safety catch is displaced to the open state. The notification signal is indicating to the user that the latch and/or the safety catch has been repositioned and the notification signal is used for a convenient and safe unlocking procedure of the hood.

According to a further aspect of the disclosure, the notification signal is a visual indication in the vehicle and/or in an external device; and/or an audial indication in the vehicle and/or in an external device. A visual and/or an audial indication in the vehicle is a simple and efficient way to notify the user. The vehicle is then equipped with suitable notification means for the visual and/or audial notification. A signal could also be sent to an external device, such as a mobile phone, and visually and/or audibly notify the user via the external device.

According to an aspect of the disclosure, the method further comprises the step; activating a visual and/or an audial warning signal if the vehicle is moving when the latch is in the open position and/or when the safety catch is in the open state. This is an important safety feature that is securing that the vehicle cannot move without a warning signal being sent out if the hood locking mechanism is in the intermediate locked mode or in the open mode. The user is thus notified to avoid accidents.

According to an aspect of the disclosure, the hood locking mechanism is moved from the intermediate locked mode to the fully locked mode if the at least one predetermined vehicle condition is not fulfilled after the predetermined time interval. This is further increasing the safety of the system, since with this function the hood can be automatically closed if the at least one predetermined vehicle condition is not fulfilled after the predetermined time interval.

The disclosure further concerns a system for unlocking a hood of a vehicle, and a vehicle having a system for unlocking a hood, where the system is including a hood locking mechanism comprising a latch, a safety catch, a locking member, and a striker. The latch and the safety catch are arranged for engaging the striker and the locking member is arranged for engaging the safety catch. A door of the vehicle in a closed position is blocking an inner hood handle, wherein the door is arranged for giving access to the inner hood handle when the door is manually displaced from the closed position to an open position in a fully locked mode of the hood locking mechanism. The inner hood handle is arranged for moving the hood locking mechanism from the fully locked mode to an intermediate locked mode through manual activation, wherein the activation of the inner hood handle mechanically is displacing the latch from a closed position where the latch is in locking engagement with the striker to an open position where the latch is disengaged from the striker. A sensor is arranged for being triggered by the latch, when the latch is displaced to the open position, wherein an electrical signal from the sensor is activating the locking member after a predetermined time interval if at least one predetermined vehicle condition is fulfilled, where upon activation, the locking member is configured to being displaced from a first position wherein the locking member is in locking engagement with the safety catch to a second position where the locking member is disengaged from the safety catch. The safety catch is arranged for being displaced from a closed state where the safety catch is in locking engagement with the striker to an open state where the safety catch is disengaged from the striker for moving the hood locking mechanism from the intermediate locked mode to an open mode.

The hood unlocking system is providing a simple way for unlocking the hood of the vehicle with only a single-pull action, which gives a premium feeling to the user of the vehicle. With the system, a solution that is not requiring double manual operation from the user is achieved with the same safety level as with traditional single-pull systems, since the system is equipped with a safety catch. The system is further convenient to use and fulfils the safety regulations, and the user is with the hood unlocking system not required to open the hood at the front section of the car. Therefore, the system is providing a more convenient opening of the hood compared to both the single-pull systems and the double-pull systems used today.

BRIEF DESCRIPTION OF THE DRAWINGS

The disclosure will be described in greater detail in the following, with reference to the attached drawings, in which.

REFERENCE SIGNS

Figure 1:
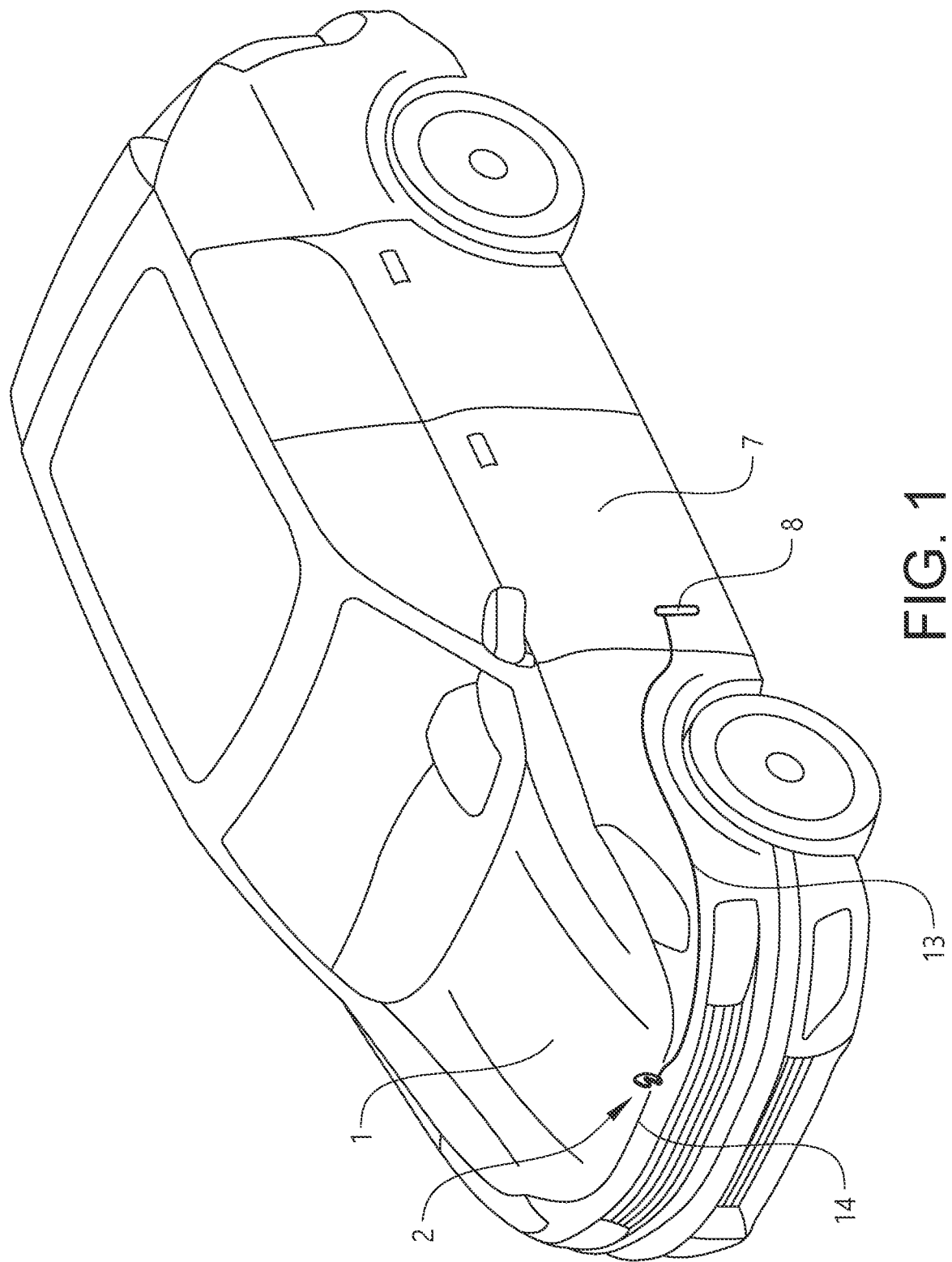
FIG. 1 shows schematically, a vehicle with a system for unlocking a hood according to the disclosure.

1: Hood
2: Hood locking mechanism
3: Latch
3*a*: Latch slot
3*b*: Latch axis
4: Safety catch
4*a*: Safety catch slot
4*b*: Safety catch axis
5: Locking member
6: Striker
7: Door
8: Inner hood handle
9: Sensor
10: Solenoid
11: Plunger
12: Pawl
12*a*: Pawl locking surface
12*b*: Pawl axis
13: Bowden cable
14: Front frame structure
15: Stopping member

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

FIG. 1 schematically shows a vehicle with a system for unlocking a hood 1 of the vehicle, where a hood locking mechanism 2 is used for unlocking the hood 1. During vehicle service, maintenance, or inspection, the hood 1 of the vehicle needs to be opened by a user of the vehicle, or by other persons, such as service technicians, that are having access to the vehicle. For safety reasons, the hood 1 is designed so that during driving the hood 1 is firmly closed by the hood locking mechanism 2. The hood locking mechanism 2 is preventing that the hood 1 is unintentionally opened during driving. In crash situations or accidents, the hood 1 should remain in its closed position to avoid unnecessary injuries or damage and therefore the hood locking mechanism 2 is made in a robust construction.

In FIGS. 3, 4A-4C, details of the hood locking mechanism 2 are shown in schematic views. The hood locking mechanism 2 comprises a latch 3, a safety catch 4, a locking member 5, and a striker 6. The striker 6 is attached to the hood 1 of the vehicle and the striker 6 is arranged to interact with the latch 3 and the safety catch 4. The latch 6 may be of any suitable construction and is following the hood 1 when the hood 1 is moved between a closed position and an open position. The latch 3, the safety catch 4 and the locking member 5 are arranged in connection to each other in a front section of the vehicle and may as an example be integrated in a front frame structure 14 positioned below the hood 1, as illustrated in FIG. 1. The latch 3 and the safety catch 4 may for example be arranged in a conventional way in a lock housing structure or similar arrangement to form a locking unit that is attached to the front frame structure 14. The latch 3 and the safety catch 4 are arranged for engaging the striker 6 and the locking member 5 is arranged for engaging the safety catch 4, as will be further described below.

Figure 4A:
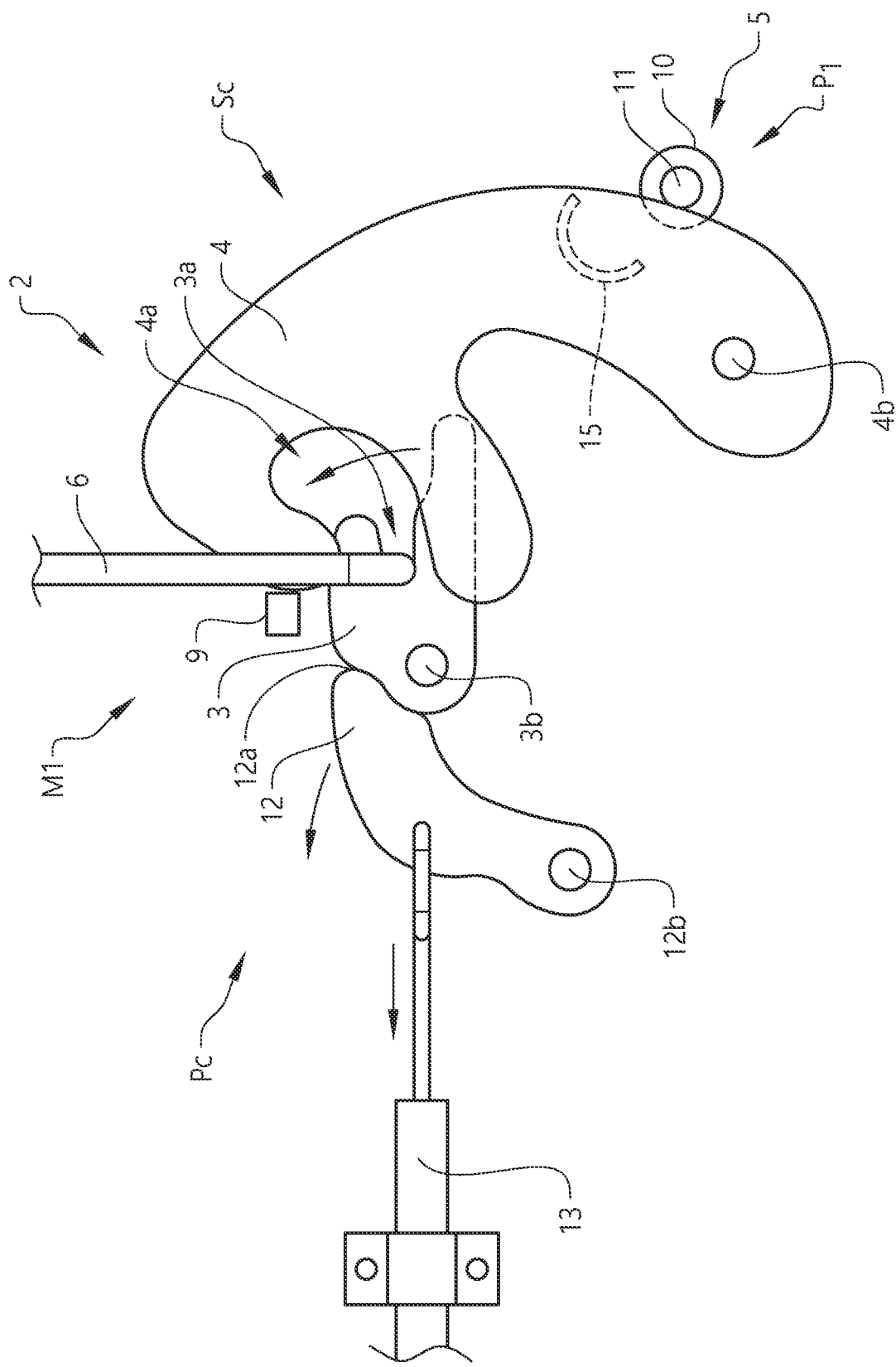
FIG. 4A shows schematically, a hood locking mechanism of the system for unlocking the hood in a fully locked mode, according to the disclosure.
Figure 4B:
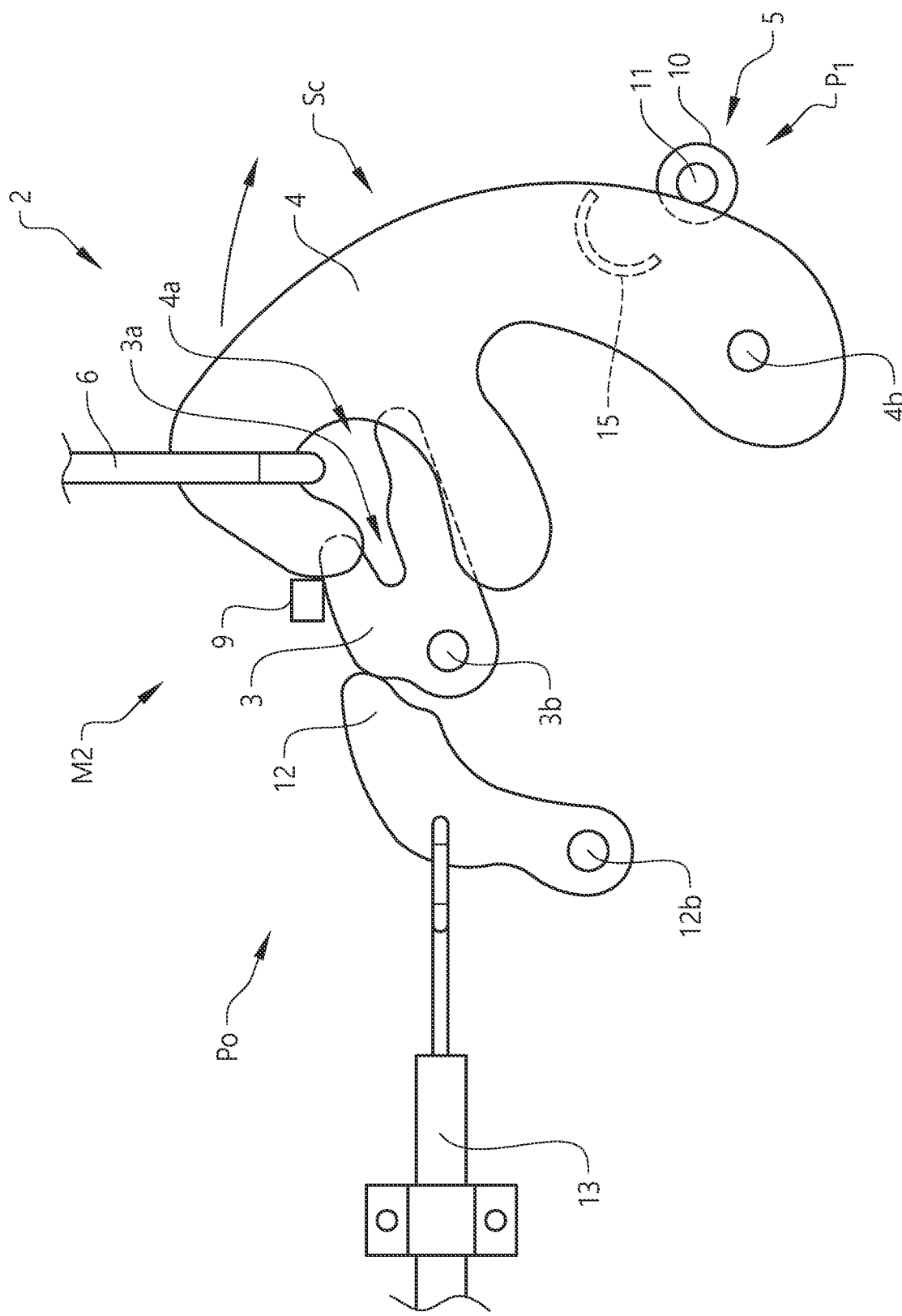
FIG. 4B shows schematically, the hood locking mechanism of the system for unlocking the hood in an intermediate locked mode, according to the disclosure.
Figure 4C:
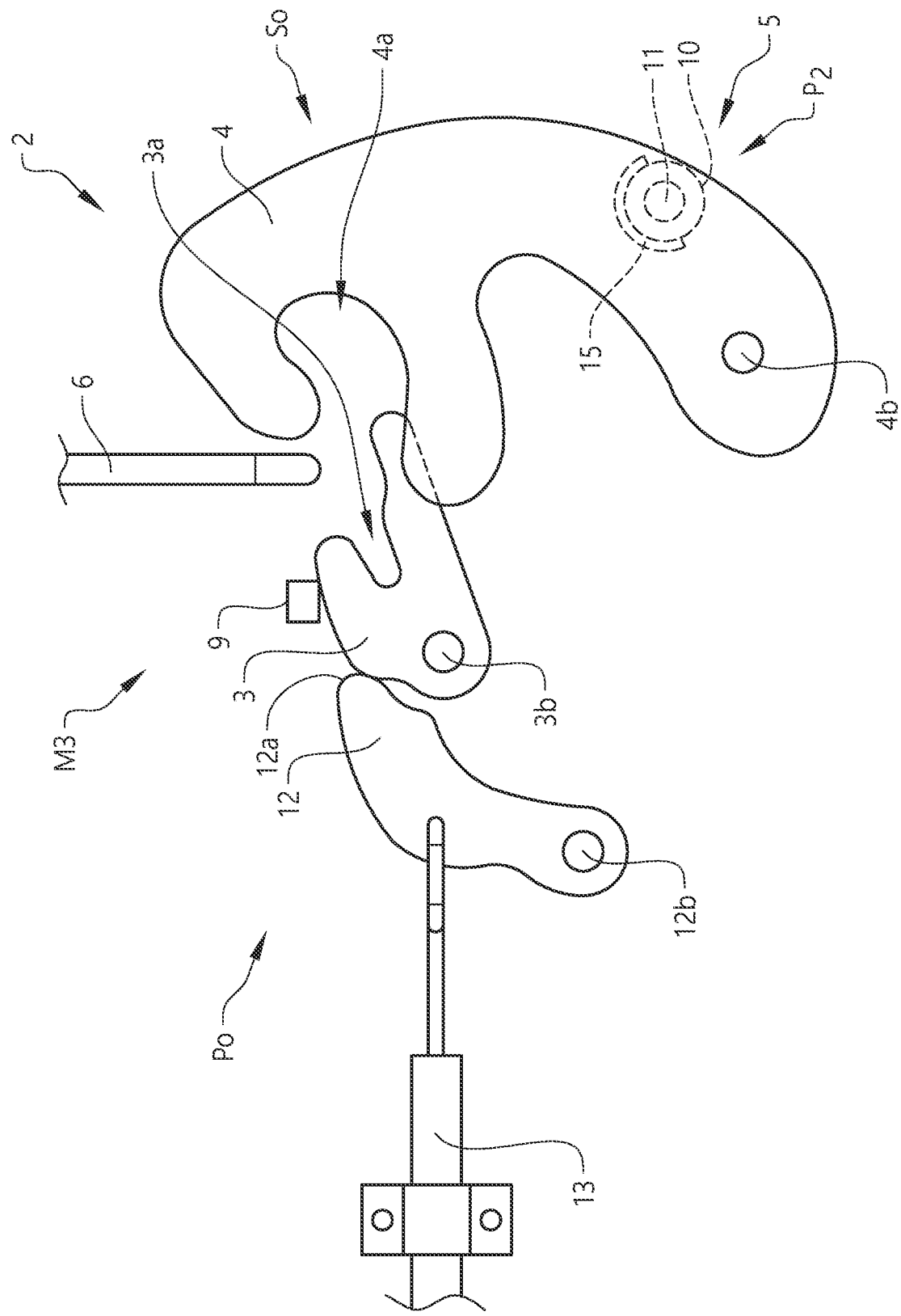
FIG. 4C shows schematically, the hood locking mechanism of the system for unlocking the hood in an open mode, according to the disclosure.

The hood locking mechanism 2 is designed to be arranged in three different modes, where the striker 6 is having different positions in relation to the latch 3 and/or the safety catch 4 in the different modes. During the unlocking operation, the hood locking mechanism 2 is moving from a fully locked mode M1, as shown in FIG. 4A, to an open mode M3, as shown in FIG. 4C. The hood locking mechanism 2 is having an intermediate locked mode M2 between the fully locked mode M1 and the open mode M3 to prevent unintentional opening of the hood, as shown in FIG. 4B. The three different modes are providing a safe hood locking and unlocking system, and the hood 1 is opened from the fully locked mode M1 to the open mode M3 in two different steps. The intermediate locked mode M2 is securing that the hood 1 is not fully opened in only one step which could cause accidents if the hood 1 is opened unintentionally, for example during driving. The intermediate locking mode M2 is thus configured so that the system cannot move the hood locking mechanism 2 directly from the fully locked mode M1 to the open mode M3. In the fully locked mode both the latch 3 and the safety catch 4 are securing that the striker 6 is engaged and that the hood 1 cannot be opened. In the intermediate locked mode M2, the safety catch 4 is engaging the striker 6 preventing that the hood 1 is being further opened.

The hood unlocking system and the method for unlocking the hood 1 is designed to provide a simple way for unlocking the hood 1 of the vehicle, where the method is convenient to the user of the vehicle and fulfills the safety regulations. According to the disclosure, the system is configured as a single-pull action unlocking mechanism, and with the method, a solution that is not requiring double manual operation from the user is achieved with the same safety level as with traditional single-pull systems. The user is with the system and method not required to open the hood 1 at the front section of the car as with traditional single-pull systems, and with only a single-pull action at least the same premium feeling as with a traditional double-pull system is achieved. Thus, the method is providing a more convenient opening of the hood compared to both the single-pull systems and the double-pull systems used today.

In FIG. 4A, the fully locked mode M1 of the hood locking mechanism 2 is shown. In the fully locked mode M1, the latch 3 and the safety catch 4 are in locking engagement with the striker 6, preventing that the hood 1 is being opened. As shown in FIG. 4A, the latch 3 is provided with a latch slot 3a that is holding the striker 6 in a locked position. The safety catch 4 is provided with a safety catch slot 4a that is arranged to catch the striker 6 if the latch 3 is unintentionally unlocked, for example if a malfunction of the latch 3 occurs. As shown in FIG. 4A, the striker 6 is arranged inside the safety catch slot 4a and the safety catch 4 is thus in locking engagement with the striker 6.

In FIG. 4B, the intermediate locked mode M2 of the hood locking mechanism 2 is shown. In the intermediate locked mode M2, the latch 3 is disengaged from the striker 6, and the safety catch 4 is in locking engagement with the striker 6, preventing that the hood 1 is being opened. As shown in FIG. 4B, the striker 6 is released from the latch slot 3a, and the safety catch slot 4a of the safety catch 4 is engaging the striker 6 in the intermediate locked mode M2. As shown in FIG. 4B, the striker 6 is arranged inside the safety catch slot 4a and the safety catch 4 is thus in locking engagement with the striker 6.

In FIG. 4C, the open mode M3 of the hood locking mechanism 2 is shown. In the open mode M3, the latch 3 and the safety catch 4 are disengaged from the striker 6, allowing the hood 1 to be opened. As shown in FIG. 4C, the striker 6 is released from the latch slot 3a, and also from the safety catch slot 4a.

The latch 3 is arranged to being displaced from a closed position $P_C$ in the fully locked mode M1, as shown in FIG. 4A, to an open position $P_O$ in the intermediate locked mode M2 and in the open mode M3, as shown in FIGS. 4B and 4C. In the closed position $P_C$ the latch 3 is in locking engagement with the striker 6, and in the open position $P_O$ the latch 3 is disengaged from the striker 6. The latch 3 is configured so that it can pivot or rotate around a latch axis 3b, between the open position $P_O$ and the closed position $P_C$. The latch axis 3b may for example be attached to the lock housing structure and the latch 3 is rotatably arranged around the latch axis 3b in relation to the lock housing structure.

As shown in FIG. 4A, a pawl 12 is arranged to hold the latch 3 in the closed position $P_C$, and the pawl 12 in the embodiment shown is arranged with a pawl locking surface 12a that is in contact with the latch 3 in the locked position, preventing that the latch 3 can rotate around the latch axis 3a to the open position $P_O$. The pawl 12 is configured so that it can rotate around a pawl axis 12b between a locked configuration, as shown in FIG. 4A, where the pawl locking surface 12a is in locking engagement with the latch 3, and an unlocked configuration, as shown in FIGS. 4B and 4C, where the pawl 12 is disengaged from the latch 3. The pawl locking surface 12a may be arranged on a suitable part of the pawl 12 and is designed to interact with the latch 3 so that the latch 3 cannot move when the pawl 12 is in engagement with the latch 3. The pawl axis 12b may for example be attached to the lock housing structure and the pawl 12 is rotatably arranged around the pawl axis 12b in relation to the lock housing structure. The pawl 12 can be connected to a release member, such as a Bowden cable 13 connected to an inner hood handle 8, which is moving the pawl 12 from the locked configuration to the unlocked configuration through activation by a user of the vehicle. The pawl 12 may be provided with a return arrangement to move the pawl 12 from the unlocked configuration back to the locked configuration. A compression spring, an extension spring, a torsion spring, or other suitable mechanism may be used as the return arrangement for the pawl 12.

The latch 3 may be provided with a repositioning arrangement to move the latch 3 from the closed position $P_C$ to the open position $P_O$ when the pawl 12 is disengaged from the latch 3. A compression spring, an extension spring, a torsion spring, or other suitable mechanism may be used as the repositioning arrangement for the latch 3.

A sensor 9 may be arranged in connection to the latch 3, and the sensor 9 is configured to be triggered by the latch 3 when the latch 3 is displaced to the open position $P_O$. The sensor 9 may be of any suitable configuration, for example a position detection sensor, a magnetic sensor, a laser sensor or an electrical switch, such as a micro switch, that is activated when the latch 3 is in the open position $P_O$. The sensor 9 is used for detecting that the latch 3 is in the open position $P_O$ and the sensor 9 is sending a signal to a control unit used for controlling the hood locking system. The control unit may be a processing device, such as a CPU that is directing the operation of a processor and used for controlling and steering the operation of the hood locking mechanism 2.

The safety catch 4 is arranged to being displaced from a closed state $S_C$ in the fully locked mode M1 and in the intermediate locked mode M2, as shown in FIGS. 4A and 4B, to an open state $S_O$ in the open mode M3, as shown in FIG. 4C. In the closed state $S_C$ the safety catch 4 is in locking engagement with the striker 6 and in the open state $S_O$ the safety catch 4 is disengaged from the striker 6. The safety catch 4 is configured so that it can pivot or rotate around a safety catch axis 4b, between the closed state $S_C$ and the open state $S_O$. The safety catch axis 4b may for example be attached to the lock housing structure and the safety catch 4 is rotatably arranged around the safety catch axis 4b in relation to the lock housing structure.

As shown in FIGS. 4A and 4B, a locking member 5 is arranged to hold the safety catch 4 in the closed state $S_C$. In the fully locked mode M1 and in the intermediate locked mode M2, as shown in FIGS. 4A and 4B, the locking member 5 is in locking engagement with the safety catch 4. In the open mode M3, the locking member 5 is disengaged from the safety catch 4, as shown in FIG. 4C. The locking member in the embodiment shown in the figures is a solenoid 10, comprising a movable plunger 11. The solenoid 10 may be of any suitable design and construction known in the art, and is converting electrical energy into linear motion. The solenoid 10 according to disclosure comprises a coil of wire, and when a current is applied to the coil a magnetic field generated by the coil is moving the plunger 11 through the electromagnetic force generated, from an extended first position $P_1$ to a retracted second position $P_2$. When the current is no longer applied to the coil, the plunger 11 is being moved from the retracted second position $P_2$ to the extended first position $P_1$ through spring action, where a spring mechanism arranged in the solenoid 10 in a conventional way is pushing the plunger to the extended first position $P_1$.

Figure 3:
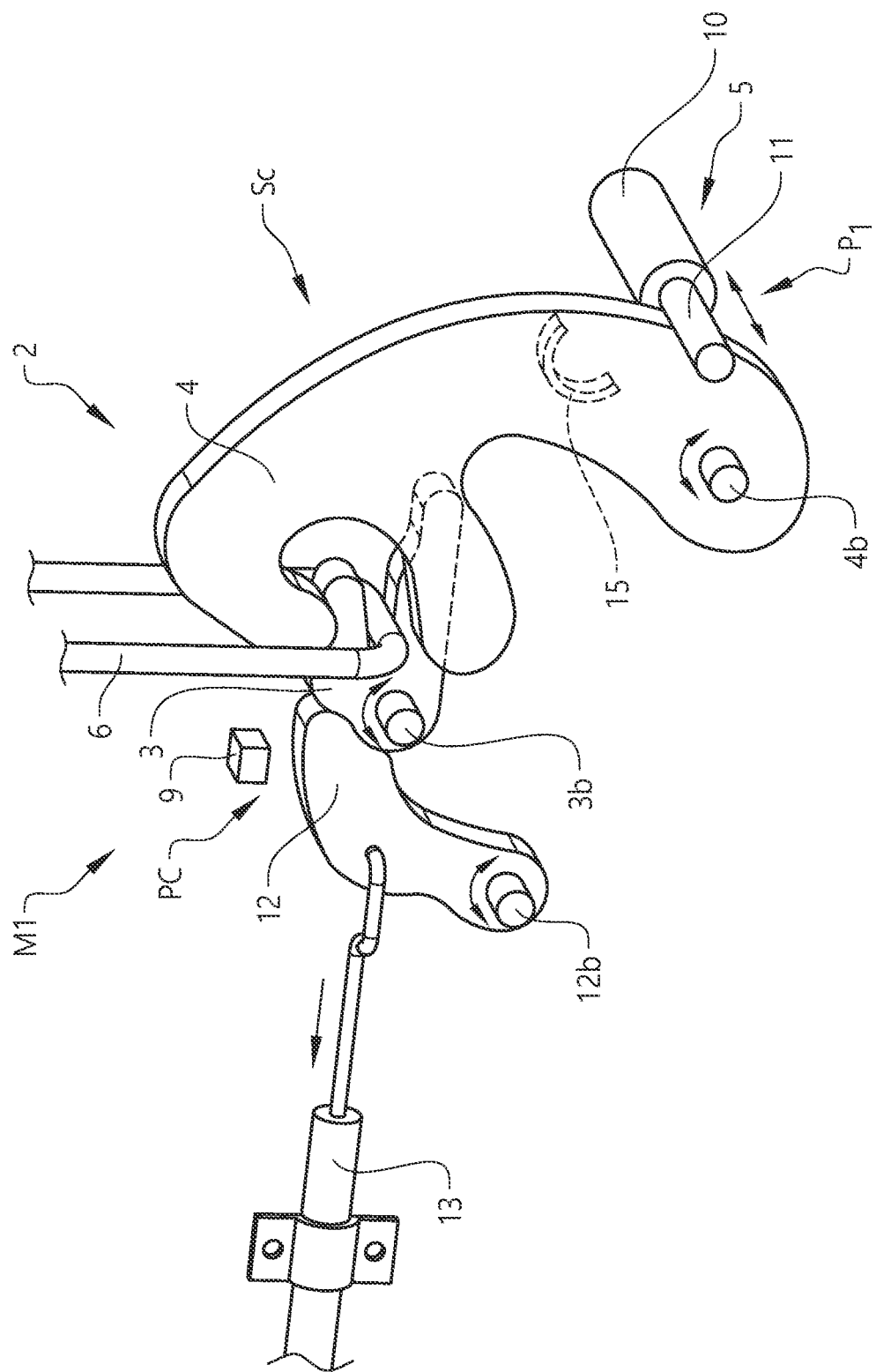
FIG. 3 shows schematically, in a perspective view, a hood locking mechanism of the system for unlocking the hood in a fully locked mode, according to the disclosure.

In the embodiment shown in FIGS. 3 and 4A-4C, the solenoid 10 when being electrically activated, is displacing the plunger 11 from the first position $P_1$, as shown in FIGS. 3, 4A and 4B where the locking member 5 is in locking engagement with the safety catch 4 to the second position $P_2$, as shown in FIG. 4C, where the locking member 5 is disengaged from the safety catch 4. When the solenoid 10 is not activated, the plunger 11 is, as described above, through spring action held in the first position $P_1$. In the first position $P_1$, the plunger 11 is in the extended state and is preventing the safety catch 4 from moving through direct contact with the safety catch 4. Thus, with the system described, the locking member 5 is electrically displaced from the first position $P_1$ to the second position $P_2$, and the plunger 11 when activated is electrically displaced from the first position $P_1$ to the second position $P_2$. When the solenoid 10 is not activated, the plunger 11 is through spring action held in the first position $P_1$.

When the control unit is receiving the signal from the sensor 9 indicating that the latch 3 is in the open position $P_O$, the control unit is starting the calculation of the predetermined time interval T. After the predetermined time interval T, the control unit is activating the locking member 5, wherein the locking member 5 is being displaced to the second position $P_2$ if certain conditions are fulfilled, as will be further described below.

The safety catch 4 can be provided with a repositioning arrangement to move the safety catch 4 from the closed state $S_C$ to the open state $S_O$ when the locking member 5 is disengaged from the safety catch 4. A compression spring, an extension spring, a torsion spring, or other suitable mechanism may be used as the repositioning arrangement for the safety catch 4. With this arrangement, the safety catch 4, when the locking member 5 is disengaged from the safety catch 4, is displaced from the closed state $S_C$ to the open state $S_O$ through spring action. To secure that the safety catch 4 is moved to a correct position in relation to the locking member 5 in the open state $S_O$, the locking member may comprise a stopping member 15 preventing further movement of the safety catch 4, as shown in FIG. 4C. The stopping member 15 can for example be arranged as a protrusion that is engaging a part of the locking member 5 in the open state $S_O$.

As shown in FIG. 4C, the safety catch 4 is in the open state $S_O$ blocking the locking member 5, preventing that the locking member 5 is being displaced from the second position $P_2$ to the first position $P_1$. In FIG. 4C, the plunger 11 is blocked by the body of the safety catch 4 through the position of the safety catch 4 in the open state $S_O$. With this arrangement, the solenoid 10 only needs to be activated until the safety catch 4 has been moved from the closed state $S_C$ to the open state $S_O$. In the open state $S_O$, the plunger 11 is prevented from moving to the second position through spring action since the safety catch 4 is blocking the movement of the plunger 11. The plunger 11 is free to move to the first position $P_1$ through spring action when the safety catch 4 has been moved to the closed state $S_C$. With this arrangement, electric power only needs to be supplied to the solenoid 10 until the safety catch 4 has been moved to the open state $S_O$, which provides an energy efficient solution minimizing the energy consumption of the system.

When the solenoid is activated, the plunger 11 is being displaced from the first position $P_1$ to the second position $P_2$. In the second position $P_2$, the plunger 11 is in the retracted state and is allowing the safety catch 4 to move from the closed state $S_C$ to the open state $S_O$ through spring action. Thus, in the second position $P_2$, the locking member 5 is no longer blocking the movement of the safety catch 4, wherein the safety catch 4, when the locking member 5 is disengaged from the safety catch 4, is displaced from the closed state $S_C$ to the open state $S_O$ through spring action. The plunger 11 may be provided with a rounded head or similar arrangement so that the safety catch 4 easily can move past the plunger 11 to the open state $S_O$.

To open the hood 1 of the vehicle, the user should manually displace the latch 3 from the closed position $P_C$ to the open position $P_O$. To displace the latch 3, the user is displacing the pawl 12 from the locked configuration to the unlocked configuration via the inner hood handle 8 arranged within the interior structure of the vehicle. The inner hood handle 8 is connected to the pawl 12 with the Bowden cable 13 and when pulling the inner hood handle 8, the Bowden cable 13 is displacing the pawl 12 from the locked configuration to the unlocked configuration. The pawl 12 is displaced by a single-pull action by the user and when the pawl 12 is displaced into the unlocked configuration, the latch 3 is allowed to move from the closed position $P_C$ to the open position $P_O$, since the pawl 12 is disengaged from the latch 3. The inner hood handle 8 may be of any suitable construction known in the art, such as for example a pivoting or translating handle arranged to displace the pawl 12 via the Bowden cable 13.

Figure 2B:
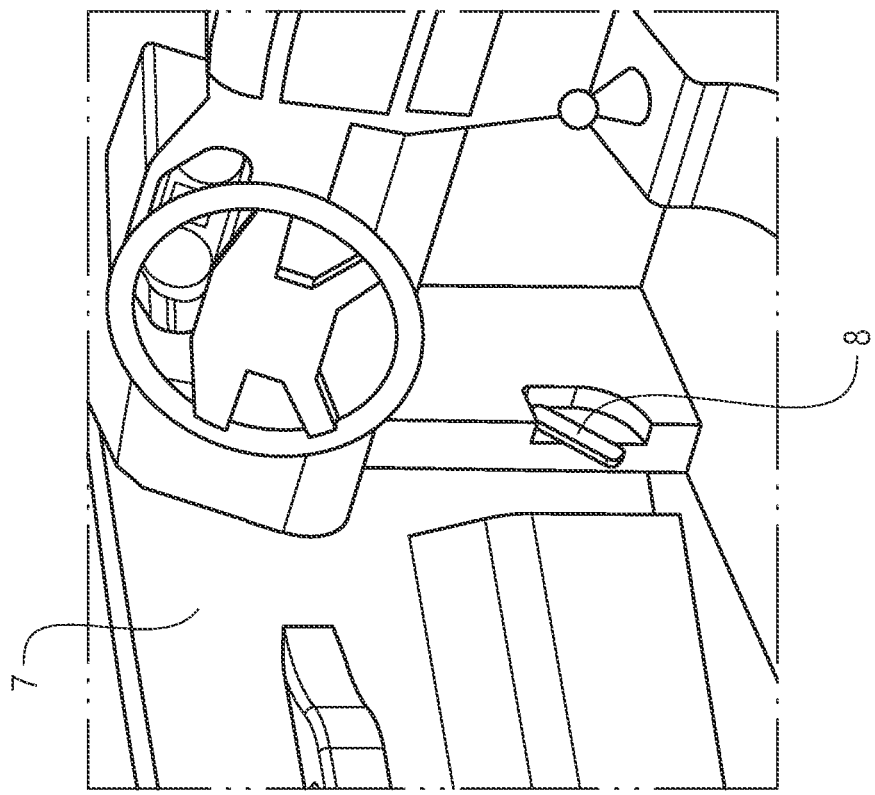
FIGS. 2A-2B show schematically, an interior structure of the vehicle with the system for unlocking the hood according to the disclosure.
Figure 2A:
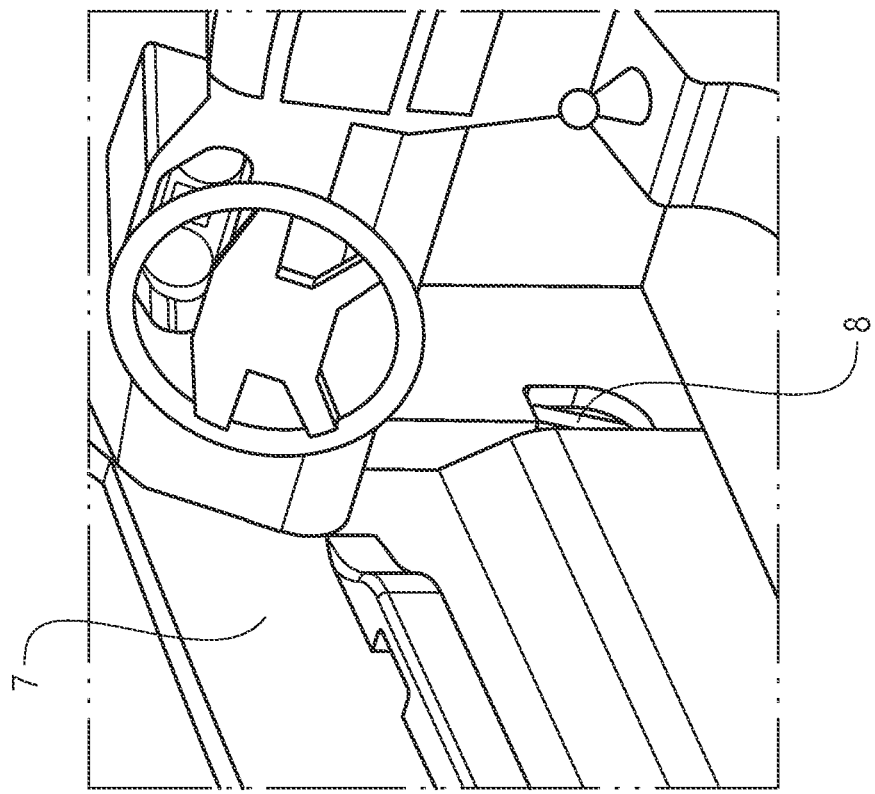

In FIGS. 2A and 2B an interior structure of the vehicle is shown. In FIG. 2A, a door 7 of the vehicle is shown in a closed position, and in FIG. 2B the door 7 is shown in an open position. The inner hood handle 8 is arranged in relation to the door 7 so that at least a part of a door structure of the door 7 is preventing opening of the inner hood handle 8 when the door 7 is in the closed position. The door 7 according to the disclosure may be any of the side doors of the vehicle, but normally the inner hood handle 8 is arranged in relation to the driver's side door. The door 7 may be configured in a way where the door structure, such as for example a part of a door frame or a part of a door panel, in the closed position is covering at least a part of the inner hood handle 8 preventing access to the inner hood handle 8. As an alternative, the door 7 in the closed position is blocking the displacement or activation of the inner hood handle 8 preventing that the inner hood handle can be used for opening the hood 1. This design of the door 7 in relation to the inner hood handle 8 is used for preventing that the inner hood handle 8 can be used for opening the hood 1 when the door 7 is in the closed position. In order to open the hood 1, the user must open the door 7 and thereafter displace or activate the inner hood handle 8 to open the hood 1. The purpose with this arrangement is to further increase the safety of the method and system.

To unlock the hood 1 of the vehicle, the steps described below need to be executed in relation to the hood unlocking system and the hood locking mechanism 2. As described above, the hood locking mechanism comprises the latch 3, the safety catch 4, the locking member 5, and the striker 6. The latch and the safety catch are arranged for engaging the striker and the locking member is arranged for engaging the safety catch.

In the fully locked mode M1 of the hood locking mechanism 2, the door 7 of the vehicle is manually displaced from the closed position to the open position for giving access to the inner hood handle 8, where the door 7 in the closed position is blocking the inner hood handle 8. The user of the vehicle is thus manually opening the door 7 to get access to the inner hood handle 8. In the closed position of the door 7, the hood handle 8 is blocked by the door 7 and therefore the opening of the door 7 is required in order to get access to the inner hood handle 8. With getting access to the inner hood handle 8 is meant that the user in a consecutive step should have the possibility to displace or activate the inner hood handle.

In the fully locked mode M1, the inner hood handle 8 is manually activated for moving the hood locking mechanism 2 from the fully locked mode M1 to the intermediate locked mode M2. The activation of the inner hood handle 8 is mechanically displacing the latch 3 from the closed position $P_C$ where the latch 3 is in locking engagement with the striker 6 to the open position $P_O$ where the latch 3 is disengaged from the striker 6. When activating the inner hood handle 8, for example through a pulling action, which may depend on the design of the handle, the pawl 12 is moved to the unlocked configuration through the interaction with the inner hood handle 8 via the Bowden cable 13. When the pawl 12 is in the unlocked configuration, the latch 3 is as described above displaced from the closed position $P_C$ to the open position $P_O$ through spring action, where in the open position $P_O$ the latch 3 is disengaged from the striker 6. Through the disengagement of the striker 6, the system is in the intermediate locking mode M2.

The sensor 9 is triggered by the latch 3, when the latch 3 is displaced to the open position $P_O$. An electrical signal from the sensor 9 is activating the locking member 5 after a predetermined time interval T if at least one predetermined vehicle condition is fulfilled, where upon activation, the locking member 5 is displaced from the first position $P_1$ where the locking member 5 is in locking engagement with the safety catch 4 to the second position $P_2$ where the locking member 5 is disengaged from the safety catch 4. The control unit may for example be used to determine if the at least one predetermined vehicle condition is fulfilled. The predetermined vehicle conditions are used for further increasing the safety of the system, as will be further described below, and unless the at least one predetermined vehicle condition is fulfilled the locking member 5 will not be activated and displaced to the second position $P_2$ where the locking member 5 is disengaged from the safety catch 4. Thus, if the at least one predetermined vehicle condition is not fulfilled, the locking member 5 will remain in the first position $P_1$ where the locking member 5 is in locking engagement with the safety catch 4. The predetermined time interval T is chosen to secure that a high level of safety of the system is achieved with the method, which is ensuring that the at least one predetermined vehicle condition is fulfilled after the predetermined time interval T. As an example, the predetermined time interval T may be in the range of 1-30 seconds. A suitable predetermined time interval T may for example be dependent on safety regulations or legislations.

If the at least one predetermined vehicle condition is fulfilled, the safety catch 4 is displaced from the closed state $S_C$ where the safety catch 4 is in locking engagement with the striker 6 to the open state $S_O$ where the safety catch 4 is disengaged from the striker 6. When the safety catch 4 is disengaged from the striker 6, the hood locking mechanism 2 is moved from the intermediate locked mode M2 to the open mode M3. In the open mode M3, the striker 6 is fully disengaged from both the latch 3 and the safety catch 4 and the user can move the hood 1 to an open position if desired. As described above, the safety catch 4 is displaced from the closed state $S_C$ to the open state $S_O$ through spring action, where in the open state $S_O$ the safety catch 4 is disengaged from the striker 6.

With the operational method described, a single-pull solution that is not requiring double manual operation from the user is achieved. This gives a premium feeling to the vehicle, and the solution is further avoiding the problem with less safe double-pull activated hood opening mechanisms, where a single opening mechanism is used for unlocking the hood.

To increase the safety of the system, the at least one predetermined vehicle condition can be a standstill position of the vehicle, an open position of a vehicle driver door, an activated position of a parking brake, and/or a parking position of a transmission of the vehicle, and thus the predetermined vehicle conditions are one or more prerequisites that needs to be fulfilled before it is possible to open the hood 1. If the one or more predetermined vehicle conditions are not fulfilled, the system will refuse a continued unlocking of the hood 1. The evaluation if the predetermined vehicle conditions are fulfilled can be done by the control unit. Since the one or more predetermined vehicle conditions can be used as prerequisites for a continued hood unlocking process, the predetermined vehicle conditions are securing that the hood 1 is opened only in safe vehicle situations. The prerequisites a standstill position of the vehicle, an activated position of a parking brake, and/or a parking position of a transmission of the vehicle is securing that the vehicle is not moving when opening the hood 1. The prerequisite open position of a vehicle driver door can be used to secure that the user of the vehicle actively is performing a conscious action, and could especially be used in combination with another of the conditions where the vehicle is in a standstill position.

To even further increase the safety of the system, the at least one predetermined vehicle condition can also be a determination if a user is standing in front of the vehicle. The determination if the user is standing in front of the vehicle can for example be established through key position recognition and/or biometric recognition. The vehicle can for example with known systems be designed to recognize or detect if the vehicle key is in a position if front of the vehicle. Further, the vehicle may be equipped with a biometric sensor that is recognizing if the user is positioned in front of the vehicle. The biometric sensor may for example be a face recognition sensor that is detecting the face of the user. Other types of suitable biometric sensors may also be used, such as fingerprint sensors, hand detection sensors or eye detection sensors. This prerequisite may be used to secure that the user of the vehicle is actively taking action and is standing in front of the vehicle before the hood is opened. The user of the vehicle must actively perform a conscious action before the hood 1 can be unlocked. The condition if a user is standing in front of the vehicle could especially be used in combination with another of the conditions where the vehicle is in a standstill position.

The safety level of the system can easily be modified through the at least one predetermined vehicle condition. By specifying one or more of the predetermined vehicle conditions for a certain vehicle or vehicle application the safety level can be specifically designed for the vehicle, or be modified for example if safety regulations are changing. Other predetermined vehicle conditions than the ones described above may also be used.

The disclosed hood locking mechanism 2 is a single-pull action hood unlocking mechanism. The manual activation of the inner hood handle 8 is a single-pull action that is releasing the hood 1 of the vehicle from the fully locked mode M1 to the intermediate locked mode M2. To further move the hood locking mechanism 2 from the intermediate locked mode M2 to the open mode M3, the system will automatically perform the necessary actions, provided that the at least one predetermined vehicle conditions is fulfilled. The user of the vehicle needs to secure that the prerequisites for unlocking the hood are fulfilled and thereafter through the single-pull action activate the system. The system is further providing an energy efficient solution, where the components involved only need to be supplied with electrical power during activation or displacement.

The system and method may further comprise an activation of a notification signal when the latch 3 is displaced to the open position $P_O$, and/or when the safety catch 4 is displaced to the open state $S_O$. With the notification signal an indication is given to the user that the latch and/or the safety catch has been repositioned, and the notification signal is used for a convenient and safe unlocking procedure of the hood 1. The notification signal may as an example be a visual indication in the vehicle and/or in an external device. As an alternative, the notification signal may be an audial indication in the vehicle and/or in an external device. There is also a possibility to combine a visual indication in the vehicle and/or in an external device with an audial indication in the vehicle and/or in an external device. A visual indication or an audial indication in the vehicle is a simple and efficient way to notify the user. The vehicle may be equipped with suitable notification means for the visual and/or audial notification, such as a display or a loudspeaker. The displays and sound systems already present in the vehicle may be used for notifying the user. A signal could also be sent to an external device, such as a mobile phone, and visually and/or audibly notify the user via the external device that the latch 3 is displaced to the open position $P_O$, and/or that the safety catch 4 is displaced to the open state $S_O$.

The system and method may further comprise an activation of a visual and/or an audial warning signal if the vehicle is moving when the latch 3 is in the open position $P_O$ and/or when the safety catch 4 is in the open state $S_O$. This is an important safety feature that is securing that the vehicle cannot move without a warning signal being sent out if the hood locking mechanism 2 is in the intermediate locked mode M2 or in the open mode M3. The user is notified in an efficient way with the warning signal, which may prevent accidents. The warning signal may in the same way as with the notification signal described above be a visual indication in the vehicle and/or in an external device. As an alternative, the warning signal may be an audial indication in the vehicle and/or in an external device. There is also a possibility to combine a visual indication in the vehicle and/or in an external device with an audial indication in the vehicle and/or in an external device. The vehicle may be equipped with suitable warning means for the visual and/or audial warning signal, such as a display or a loudspeaker. The displays and sound systems already present in the vehicle may be used for warning the user that the vehicle is moving when the latch 3 is in the open position $P_O$, and/or when the safety catch 4 is in the open state $S_O$. A signal could also be sent to an external device, such as a mobile phone, and visually and/or audibly notify the user via the external device.

Figure 5:
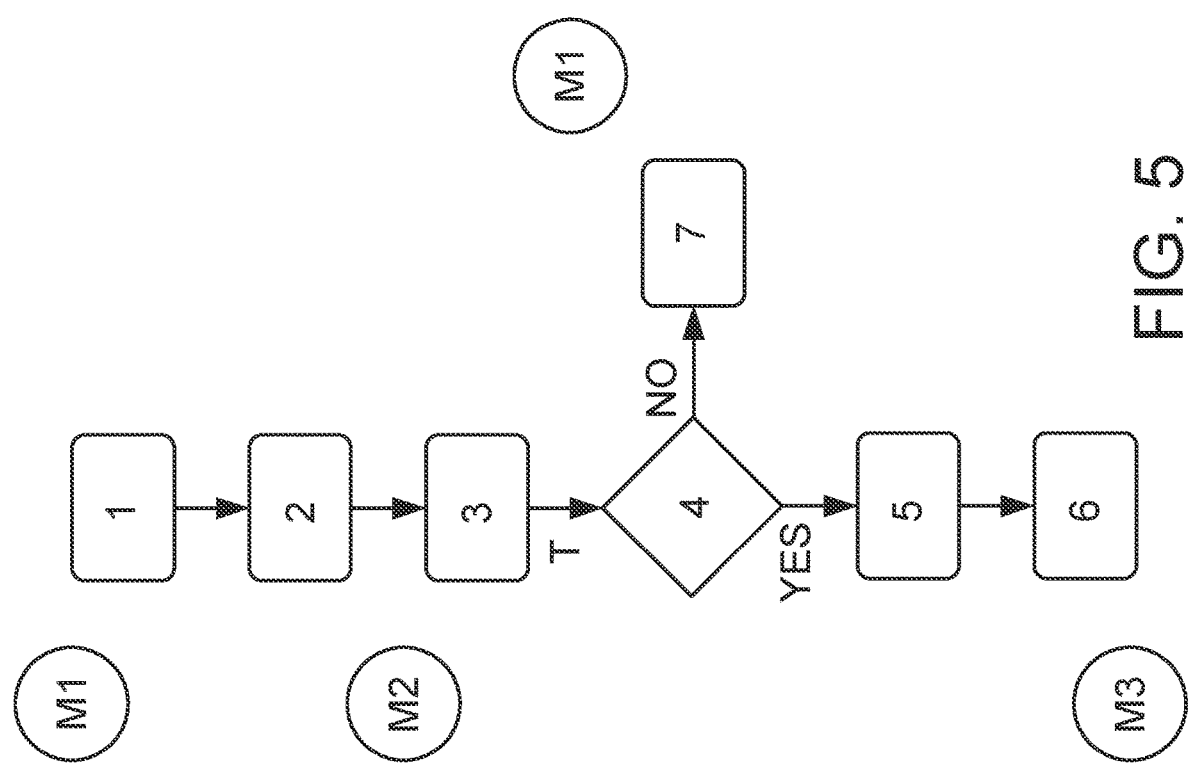
FIG. 5 shows schematically, a flow chart for the method for unlocking a hood, according to the disclosure.

The system for unlocking the hood 1 of the vehicle according to the disclosure, comprises the hood locking mechanism 2 comprising the latch 3, the safety catch 4, the locking member 5, and the striker 6, where the latch 3 and the safety catch 4 are arranged for engaging the striker 6 and the locking member 5 is arranged for engaging the safety catch 4. In FIG. 5, the unlocking sequence of the hood locking mechanism 2 is schematically shown. The door 7 of the vehicle is in the closed position blocking the inner hood handle 8, and the door 7 is arranged for giving access to the inner hood handle 8 when the door 7 is manually displaced from the closed position to the open position in the fully locked mode M1 of the hood locking mechanism 2. Step 1 in the unlocking sequence in FIG. 5 is corresponding to the manual displacement of the door 7 from the closed position to the open position for giving access to the inner hood handle 8. The inner hood handle 8 is arranged for moving the hood locking mechanism 2 from the fully locked mode M1 to an intermediate locked mode M2 through manual activation. The manual activation of the inner hood handle 8 is mechanically displacing the latch 3 from the closed position $P_C$ where the latch 3 is in locking engagement with the striker 6 to the open position $P_O$ where the latch 3 is disengaged from the striker 6, and this sequence is corresponding to step 2 in FIG. 5. After steps 1 and 2, the hood locking mechanism 2 has been moved from the fully locked mode M1 to the intermediate locked mode M2. The sensor 9 is arranged for being triggered by the latch 3 when the latch 3 is displaced to the open position $P_O$, and an electrical signal from the sensor 9 is activating the locking member 5 after the predetermined time interval T if the at least one predetermined vehicle condition is fulfilled. The triggering of the sensor 9 is illustrated in FIG. 5 as step 3. In step 4 shown in FIG. 5, it is determined if the at least one predetermined vehicle condition is fulfilled, and the predetermined time interval T must be completed before the system is moving from step 3 to step 4. If the at least one predetermined condition is fulfilled, the locking member 5 is being activated in step 5 in FIG. 5. Upon activation, the locking member 5 is configured to being displaced from the first position $P_1$ wherein the locking member 5 is in locking engagement with the safety catch 4 to the second position $P_2$ where the locking member 5 is disengaged from the safety catch 4. In step 6, the safety catch 4 is being displaced for moving the hood locking mechanism 2 from the intermediate locked mode M2 to the open mode M3. The safety catch 4 is arranged for being displaced from the closed state $S_C$ where the safety catch 4 is in locking engagement with the striker 6 to the open state $S_O$ where the safety catch 4 is disengaged from the striker 6 for moving the hood locking mechanism 2 from the intermediate locked mode M2 to the open mode M3.

To close the hood 1 when the hood locking mechanism 2 is in the open mode M3, the hood is simply manually displaced by the user in a closing direction of the hood 1, which normally is in a downwards direction. When displacing the hood in the closing direction, the striker 6 is engaging the safety catch 4 so that the safety catch 4 is moving from the open state $S_O$ to the closed state $S_C$. When the safety catch 4 is moved to the closed state $S_C$, the locking member 5 is being displaced to the first position $P_1$ from the second position $P_2$ through spring action, since the safety catch 4 is no longer blocking the plunger 11. Further, the striker 6 is engaging the latch 3 so that the latch is displaced from the open position $P_O$ to the closed position $P_C$. The closing of the hood 1 is in this way a mechanical operation without the need for electric power. However, it may be possible depending on the design of the vehicle to have, instead of the manual closing of the hood 1, an electric actuator that is moving the hood 1 in the closing direction.

It would also be possible to design the system and method to automatically close the hood 1 if the hood locking mechanism 2 is in the intermediate locked mode M2 and the at least one predetermined vehicle condition is not fulfilled after the predetermined time interval T. If the at least one predetermined vehicle condition is not fulfilled, for example if the vehicle is moving, the system could automatically activate the hood locking mechanism 2 so that the hood 1 is moved from the intermediate locked mode M2 to the fully locked mode M1, which is illustrated as step 7 in FIG. 5. This may for example be accomplished by an actuating mechanism that is pulling the hood 1 in the closing direction from the intermediate locked mode M2 to the fully locked mode M1. The actuating mechanism could for example be arranged as a separate actuator that is connected to the hood 1 and to the vehicle front frame structure 14. As an alternative, the latch 3 can be connected to an electric motor that is rotating the latch 3 from the open position $P_O$ to the closed position $P_C$, and with this arrangement the latch 3 is pulling the striker 6 with the rotational motion so that the hood 1 is moving in the closing direction for closing the hood 1. The electric motor could be directly or indirectly connected to for example the latch axis 3b for rotating the latch 3 from the open position $P_O$ to the closed position $P_C$. The control unit can be used for determining if the predetermined vehicle condition is not fulfilled after the predetermined time interval T, and the control unit could initiate the automated closing action of the hood 1 as described above.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. A method for unlocking a hood of a vehicle, wherein a hood locking mechanism comprises a latch, a safety catch, a locking member, and a striker; wherein the latch and the safety catch are arranged for engaging the striker and the locking member is arranged for engaging the safety catch, wherein the method comprises the steps:

manually displacing a door of the vehicle, wherein the door, in a closed position, blocks an inner hood handle, from the closed position to an open position, in a fully locked mode of the hood locking mechanism, for giving access to the inner hood handle;

manually activating the inner hood handle for shifting the hood locking mechanism from the fully locked mode to an intermediate locked mode, wherein the manual activation of the inner hood handle mechanically allows the latch to displace from a closed position, where the latch is in locking engagement with the striker, to an open position, where the latch is disengaged from the striker;

triggering a sensor by the latch when the latch is displaced to the open position, wherein an electrical signal from the sensor activates the locking member after a predetermined time interval when at least one predetermined vehicle condition is fulfilled, where upon activation of the locking member, the locking member is displaced from a first position, where the locking member is in locking engagement with the safety catch, to a second position, where the locking member is disengaged from the safety catch; and displacing the safety catch when the at least one predetermined vehicle condition is fulfilled from a closed state, in which the safety catch is in locking engagement with the striker, to an open state, in which the safety catch is disengaged from the striker for shifting the hood locking mechanism from the intermediate locked mode to an open mode.

2. The method according to claim 1, wherein in the fully locked mode, the latch and the safety catch are in locking engagement with the striker, and the locking member is in locking engagement with the safety catch; in the intermediate locked mode, the latch is disengaged from the striker, the safety catch is in locking engagement with the striker, and the locking member is in locking engagement with the safety catch; and in the open mode, the latch and the safety catch are disengaged from the striker, and the locking member is disengaged from the safety catch.

3. The method according to claim 1, wherein the at least one predetermined vehicle condition is a standstill position of the vehicle, an open position of a vehicle driver door, an activated position of a parking brake, and/or a parking position of a transmission of the vehicle.

4. The method according to claim 1, wherein the at least one predetermined vehicle condition is a determination when a user is standing in front of the vehicle.

5. The method according to claim 4, wherein the determination when the user is standing in front of the vehicle is established through key position recognition and/or biometric recognition.

6. The method according to claim 1, wherein the locking member is electrically displaced from the first position to the second position.

7. The method according to claim 1, wherein the safety catch, when in the open state, blocks the locking member, thereby preventing the locking member from being displaced from the second position to the first position.

8. The method according to claim 1, wherein the predetermined time interval is in the range 1-30 seconds.

9. The method according to claim 1, wherein the hood locking mechanism is a single-pull action hood unlocking mechanism, wherein the manual activation of the inner hood handle is a single-pull action, releasing the hood locking mechanism from the from the fully locked mode to the intermediate locked mode.

10. The method according to claim 1, wherein the locking member is a solenoid comprising a plunger, said plunger, when activated, is electrically displaced from the first position to the second position, and when not activated, through spring action, is held in the first position.

11. The method according to claim 1, wherein the safety catch, when the locking member is disengaged from the safety catch, is displaced from the closed state to the open state through spring action.

12. The method according to claim 1, wherein the method further comprises activating a notification signal when the latch is displaced to the open position and/or when the safety catch is displaced to the open state.

13. The method according to claim 12, wherein the notification signal is a visual indication in the vehicle and/or in an external device; and/or an audial indication in the vehicle and/or in an external device.

14. The method according to claim 1, wherein the method further comprises activating a visual and/or an audial warning signal if the vehicle is moving when the latch is in the open position and/or when the safety catch is in the open state.

15. The method according to claim 1, wherein the hood locking mechanism is moved from the intermediate locked mode to the fully locked mode when the at least one predetermined vehicle condition is not fulfilled after the predetermined time interval.

16. A system for unlocking a hood of a vehicle, including a hood locking mechanism comprising a latch, a safety catch, a locking member, and a striker; wherein the latch and the safety catch are arranged for engaging the striker and the locking member is arranged for engaging the safety catch,
   wherein a door of the vehicle, in a closed position, blocks an inner hood handle, wherein the door is arranged for giving access to the inner hood handle when the door is manually displaced from the closed position to an open position in a fully locked mode of the hood locking mechanism;
   wherein the inner hood handle is arranged for shifting the hood locking mechanism from the fully locked mode to an intermediate locked mode through manual activation of the inner hood handle, wherein the manual activation of the inner hood handle mechanically allows the latch to displace from a closed position, where the latch is in locking engagement with the striker, to an open position, where the latch is disengaged from the striker;
   wherein a sensor is arranged for being triggered by the latch when the latch is displaced to the open position, wherein an electrical signal from the sensor activates the locking member after a predetermined time interval when at least one predetermined vehicle condition is fulfilled, where upon activation of the locking member, the locking member is configured to being displaced from a first position, where the locking member is in locking engagement with the safety catch, to a second position, where the locking member is disengaged from the safety catch; and
   wherein the safety catch is arranged for being displaced from a closed state. where the safety catch is in locking engagement with the striker, to an open state, where the safety catch is disengaged from the striker for shifting the hood locking mechanism from the intermediate locked mode to an open mode.

17. A vehicle, having the system for unlocking the hood according to claim 16.

\* \* \* \* \*